Nov. 17, 1959     E. G. SUNDBERG ET AL     2,913,512
MICRO-POROUS RUBBER SEPARATOR FOR GALVANIC
CELLS SUCH AS ACCUMULATORS AND METHOD
OF MANUFACTURING SUCH SEPARATOR
Filed May 27, 1955
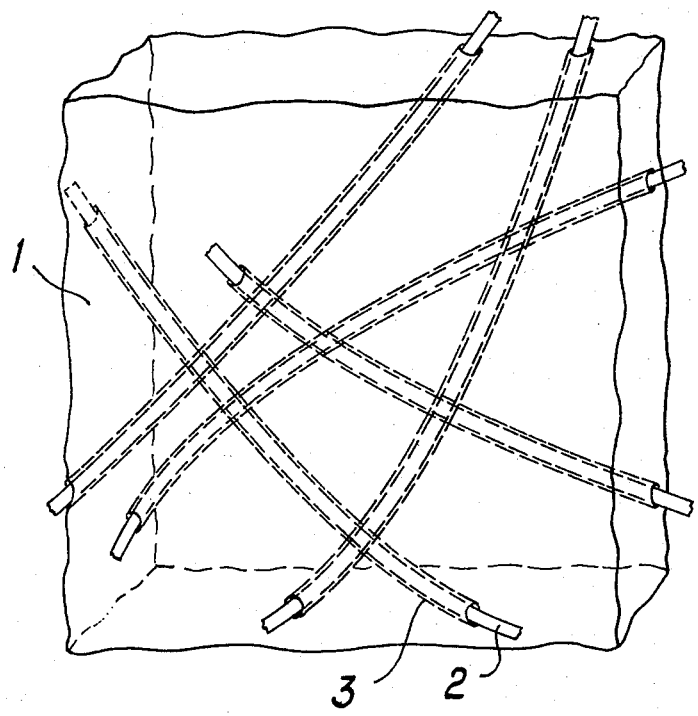
INVENTORS
ERIK GUSTAV SUNDBERG
BO YNGVE RAGNAR GARTVALL
BY    Strauch, Nolan & Neale
ATTORNEYS

United States Patent Office 2,913,512
Patented Nov. 17, 1959

2,913,512

MICRO-POROUS RUBBER SEPARATOR FOR GALVANIC CELLS SUCH AS ACCUMULATORS AND METHOD OF MANUFACTURING SUCH SEPARATOR

Erik Gustav Sundberg, Osbacken, Nol, and Bo Yngve Ragnar Gartvall, Oljeberget, Nol, Sweden, assignors to Aktiebolaget Tudor, Stockholm, Sweden, a Swedish joint-stock company Application May 27, 1955, Serial No. 511,794

Claims priority, application Sweden January 26, 1955

10 Claims. (Cl. 136—145)

The present invention relates to separators for galvanic cells such as accumulators, e.g. of the lead-acid type, and more particularly to micro-porous rubber separators, and is a continuation in part of our co-pending application, Serial No. 228,805, filed May 29, 1951, and now abandoned, for Micro-Porous Separator for Electric Accumulators and Method and Means for Making the Same.

Micro-porous rubber separators are in themselves well known. They are usually manufactured by spreading a latex dispersion on a bottom layer which dispersion is made to coagulate into a gel by heating. The gel is then vulcanized under prevention of water removal so that a micro-porous structure is obtained in the finished separator.

Since a separator made in this way is comparatively brittle and shows low tenacity, it has been proposed to embed in the rubber material a network of a thready insulating material which is resistant to the electrolyte in which the separator is intended to work. For example, in accumulators of the lead-acid type, glass fibre threads have been used as filling material. These glass fibre threads have either been mixed into the latex dispersion, or an unwoven mat of glass wool with felted fibres or fibres bound by a binding agent has been impregnated with the latex dispersion so that the glass fibre threads have formed a network in the rubber material. These embedded threads increase the mechanical strength of the separator and make possible a saving of latex material. However in hitherto known separators of this kind satisfactory strength properties have not been attained since the separators do not become very resistant to break strains.

The present invention is based upon the observation that the deficiencies of the known separators are to be ascribed to the fact that the rubber material adheres very firmly to the embedded threads, so that the latter break when subjected to stretching by bending of the separator.

It is the object of the invention to provide a micro-porous separator in which this drawback is eliminated, and according to the invention the separator is so constituted that the threads of the network extend in channels in the rubber material, said channels having a cross sectional area sufficiently large with respect to that of the threads to allow the threads or at least the main part of them to slide with some friction in said channels with respect to the rubber material of the separator without breaking due to stretching when the separator is bent.

These channels can be given such an area that capillary spaces are formed in the channels around the threads. Due to capillary action these spaces will rapidly be filled with electrolyte when the battery is put in order and contain a relatively large quantity of electrolyte during the operation of the battery and thereby facilitate the electrolyte circulation and contribute to keep the resistance of the separator low. The threads should of course be embedded in the rubber material so that the flat sides of the separator only consist of micro-porous rubber and form thin layers which are interconnected by those parts of the rubber material which extend in the interstices between the threads and practically wholly fill these interstices.

Other objects of the invention will, in part, be obvious, and will, in part, appear hereinafter.

For a fuller understanding of the nature and objects of the invention, reference should be had to the following detailed description and drawing, in which:

The figure is an enlarged perspective view of a portion of a separator illustrating in dotted lines details of the invention.

The structure of a separator according to the invention is illustrated in the accompanying drawing which shows on a highly enlarged scale a cut-out piece of the separator. Numeral 1 designates the separator body of microporous rubber. A network of threads 2 of fibrous material is embedded in the rubber. Each of the threads 2 is accommodated in a channel 3 in the rubber material. The cross sectional area of each channel 3 is sufficiently large in relation to that of the thread accommodated therein to allow the latter to slide with some friction within the channel.

The manufacture of a micro-porous separator according to the invention can be effected as follows: Before the mixing into or impregnation with the latex dispersion, the separate threads of the filling material are coated with relatively thin surface layers of a substance which is not, or at least not in any appreciable degree, dissolved, destroyed or removed in other manner in the latex dispersion as long as this is in liquid state, and which is removed wholly or for the most part by melting, dissolving, gasification or the like after the latex dispersion has been transformed into a gel by coagulation. Thus the removal of the surface layers can be effected during the vulcanization process in which the separator, while in the form of a gel, is subjected to a heat treatment at increased temperature. While the coagulation is usually effected at atmospheric pressure and a temperature of about 80° C. the vulcanization is usually effected in an autoclave in a water bath at an overpressure of about 5 atmospheres and a temperature of about 150° C. It will be understood that many substances are of such nature that they are not appreciably affected in the latex dispersion before and during the coagulation process, while they are destroyed or removed in other manner at the considerably higher vulcanization temperature and thus may be used as material for the said surface layer on the threads. Examples of such materials are natural and synthetic resins, carbohydrates, albumines, organic salts and the like. A thermoplastic material, can be used having a melting point between 80° C. and 150° C. which melts from the threads during the vulcanization process. It is not necessary that the material be entirely stable during the coagulation process, and satisfactory results are also obtained if the said material is removed to a small extent even during this process. It is essential that the main part of the material of the surface layer of the threads not be removed until the rubber material has assumed a fairly solid state, and those conditions for an appreciably increased tendency for suspension or dissolving of the material in the water bath which are present due to the relatively high temperature may thus be advantageously utilized for the complete or partial removal of the surface layers. On the other hand it is of course also possible to remove the surface layers of the threads in a physical or chemical way before or after the vulcanization in a special washing operation. It is likewise possible to choose a material which is chemically or physically dissolved in the forming bath or in the electrolyte of the accumulator after the separator has been mounted in a set of electrode plates. In the manufacture of so called dry-charged accumulators the plate sets including the separators are subjected to a drying procedure in hot gas or in a liquid drying medium which may be heated to a high temperature, and of course the removal of the material of the surface layer of the threads can also take place during such drying operation which creates good conditions for the chemical or physical dissolution or gasification of the material.

Industrial manufacture of separators according to the invention is for instance carried out thus that the glass threads having a thickness of about $15\mu$ or less and a length which is appreciable in relation to the length and width (at least some centimetres) of the finished separator, are felted into a mat of considerable length which is impregnated with the material for the said surface layer in melted or dissolved state on the threads. Said material may be dextrin, polystyrene, casein, furfural resin, phenolic resin or the like having the properties required in order that after having been brough into solid or semi-solid state it shall be substantially stable before and during the coagulation but be removed to the necessary extent upon vulcanization. The impregnating means can then be utilized at the same time as a binding agent for fixing the glass fibres with respect to each other so that the material not only forms a coating on them but also a bond between the fibres at their crossing points. The degree of impregnation, or in other words the quantity of material applied, will determine the thickness of the surface layers and thus also the cross sectional area of the channels for the threads in relation to the latter in the finished separators. The binding of the threads to each other is essential in order that the thickness of the glass wool mat and the orientation of the threads with respect to each other shall be fully fixed during the subsequent treatment. It is of course possible to use for the mutual binding of the glass wool threads a material different from that used for the surface layers on the threads, such as a binding agent which is not removed at all during the subsequent processes or in operation.

The glass wool mat thus pre-impregnated is then continuously impregnated with a mixture of latex and water together with a coagulant or coagulating agent, such as calcium formate and is passed through a tunnel oven in which coagulation takes place. As mentioned above, the surface layer material on the threads is not then removed to any appreciable extent. The band emerging from the tunnel oven and constituting of latex gel and glass threads embedded therein and coated with the surface layer material is wound into a roll with a suitable intermediate layer (e.g. of metal, paper or the like) inserted between the turns. This roll is put into an autoclave and vulcanized in well known manner. Then at least an essential portion of the surface layer material on the glass threads passes away so that the cross sectional areas of the channels in which the threads are accommodated, will be sufficiently large to secure the desired effect mentioned above.

The impregnation of the glass wool band with the material for the surface layer on the threads can be effected in a step entirely separate from the rest of the manufacturing process, and preferably at the manufacture of the glass wool band. However it is also possible to perform this impregnation immediately before the impregnation with the latex dispersion, and then drying and cooling should of course follow after the first impregnation in the case that the impregnating agent has been applied in dissolved or melted state, so that it will be in substantially solid or semi-solid state during the latex impregnation.

The following specific examples are given:

*Example 1*

A sheet of felted glass fibers or threads having a thickness of $15\mu$ and a length of several centimeters is manufactured in known manner to be felted into a mat. During the felting process, a solution of starch in water is sprayed on to the fibers. The sheet is dried whereby a layer of starch of a thickness of about 3 thousandths of a millimeter is left on the fibers. A latex dispersion is then poured over the sheet while it is kept spread on a plane surface, so that the latex dispersion forms a layer of uniform thickness in which the fiber sheet is embedded. The latex dispersion is then heated by means of steam so that it is made to coagulate. During the coagulation process the starch on the fibers swells somewhat but is otherwise unaffected. Thereafter the sheet of coagulated latex is vulcanized under pressure in an autoclave which contains water. The water dissolves the starch on the glass fibers. Thus, the starch is removed from the fibers so that the channels in the latex material in which the fibers are accommodated will have a diameter somewhat larger than that of the fibers. After the vulcanization the sheet of vulcanized latex is dried and cut into pieces of desired size.

*Example 2*

The same process as described in foregoing example is carried out but instead of starch, dextrin is used. Since dextrin dissolves rather slowly in water, it will be not completely removed during the vulcanization process, and therefore after vulcanization the latex sheet is washed with dilute sulphuric acid which dissolves and removes the remaining dextrin to thereby provide channels extending around the glass fiber threads.

*Example 3*

A sheet of felted glass fibers is sprayed with a dispersion of polyvinyl chloride. The sheet is then dried and impregnated with a latex dispersion which is subjected to coagulation and vulcanization in the manner described in the foregoing examples. After the vulcanization the sheet of vulcanized latex is treated with a solvent for polyvinyl chloride, for instance toluol or cyclohexanon, so that the polyvinyl chloride is removed from the glass fibers.

On the other hand, it is also possible to use as material for the surface layer of the threads a preferably highly viscous liquid such as an alcohol of low volatility (e.g. glycerine), a heavy hydrocarbon (e.g. mineral oil) or a fat which forms coatings on the threads which are not dissolved in the latex dispersion but may be removed by washing, gasification or the like after coagulation has occurred.

We claim:

1. In a micro-porous rubber separator for galvanic cells, a separator having embedded therein a network of acid resistant thready material, the threads of said thready network extending in channels in the micro-porous rubber material, said channels having a cross sectional area sufficiently large with respect to that of the threads to allow at least the main part of the threads to slide within said channels when said separator is flexed.

2. A micro-porous rubber separator for galvanic cells, said separator having embedded therein a network of glass fibres, said fibres extending in channels in the micro-porous rubber material, said channels having a cross sectional area sufficiently large with respect to that of the glass fibre to provide capillary spaces around said fibre and to allow the latter to slide within said channels when said separator is flexed.

3. A method of making a micro-porous rubber separator having a network of acid resistant thready material embedded therein, comprising the steps of impregnating the thready material with a latex dispersion, coagulating the latex dispersion, and further comprising the steps of coating the threads of the thready material before it is impregnated with the latex dispersion with a thin surface layer of a substance which is retained on the threads as long as the latex dispersion is in liquid state, and removing said surface layer from the threads.

4. A method of making a micro-porous separator having a network of glass fibres embedded therein, comprising the steps of impregnating a mat of glass wool with a latex dispersion and coagulating said latex dispersion, and further comprising the steps of coating the fibres in said glass wool mat before it is impregnated with the latex dispersion with a substance which is retained on the glass fibres as long as the latex dispersion is in liquid state, and removing said surface layer from the glass fibres after the latex composition has coagulated.

5. In the method of making a micro-porous rubber separator having a network of fibers embedded therein, the steps comprising forming a sheet of felted fibers, coating the fibers with a solution of a carbohydrate, drying said sheet to leave a coating of solid carbohydrate on the fibers, impregnating said sheet with a latex dispersion to form a layer of latex having the sheet of felted fibers embedded therein, coagulating the latex, vulcanizing the coagulated latex to transform it into a sheet of micro-porous rubber, and washing the sheet of rubber with a solvent for said carbohydrate to remove said coating of carbohydrate from the fibers.

6. A method as claimed in claim 5 in which said fibers are glass fibers.

7. A method as claimed in claim 5 in which said carbohydrate is starch.

8. A method as claimed in claim 5 in which said carbohydrate is dextrin.

9. In the metod of making a micro-porous rubber separator having a network of fibers embedded therein, the steps comprising forming a sheet of felted fibers, coating the fibers with a dispersion of a thermoplastic material, drying said sheet to leave a coating of solid thermoplastic material on the fibers, impregnating said sheet with a latex dispersion to form a layer of latex having the sheet of felted fibers embedded therein, coagulating the latex, vulcanizing the coagulated latex to transform it into a sheet of micro-porous rubber, and washing the sheet of rubber with a solvent for said thermoplastic material to remove said coating of thermoplastic material from the fibers.

10. A method as claimed in claim 9 in which said thermoplastic material is polystyrene.

References Cited in the file of this patent

UNITED STATES PATENTS

| | | |
|---|---|---|
| 2,155,016 | Kershaw | Apr. 18, 1939 |
| 2,168,366 | Slayer | Aug. 8, 1939 |
| 2,247,091 | Jumau | June 24, 1941 |
| 2,306,781 | Francis, Jr. | Dec. 29, 1942 |
| 2,311,613 | Slayer | Feb. 16, 1943 |
| 2,336,797 | Maxwell | Dec. 14, 1943 |
| 2,568,144 | Cremer et al. | Sept. 18, 1951 |
| 2,578,534 | Giles et al. | Dec. 11, 1951 |

FOREIGN PATENTS

| | | |
|---|---|---|
| 451,628 | Great Britain | Aug. 10, 1936 |

UNITED STATES PATENT OFFICE
CERTIFICATE OF CORRECTION

Patent No. 2,913,512                              November 17, 1959

Erik Gustav Sundberg et al.

It is hereby certified that error appears in the printed specification of the above numbered patent requiring correction and that the said Letters Patent should read as corrected below.

Column 2, line 22, for "sectonial" read -- sectional --; column 3, line 23, for "trough" read -- brought --; column 4, line 30, for "will be not," read -- will not be --; column 5, line 15, for "composition" read -- dispersion --.

Signed and sealed this 7th day of June 1960.

(SEAL)
Attest:

KARL H. AXLINE                                    ROBERT C. WATSON

Attesting Officer                                    Commissioner of Patents